United States Patent [19]

Williams

[11] 4,206,901
[45] Jun. 10, 1980

[54] PRESSURE-ACTUATED VALVE WITH METERING CHOKE

[75] Inventor: Tom Williams, Corona Del Mar, Calif.

[73] Assignee: Thompson Manufacturing Co., Los Angeles, Calif.

[21] Appl. No.: 840,822

[22] Filed: Oct. 11, 1977

[51] Int. Cl.² .......................................... F16K 31/126
[52] U.S. Cl. ...................................... 251/35; 251/46;
251/120; 138/43; 138/46; 137/DIG. 3
[58] Field of Search ...................... 138/43, 46; 251/45,
251/46, 120, DIG. 3, 35, 122

[56] References Cited

U.S. PATENT DOCUMENTS

| | | | |
|---|---|---|---|
| 1,046,236 | 12/1912 | Wagner | 251/35 |
| 1,625,921 | 4/1927 | Vallier | 251/120 |
| 2,604,119 | 7/1952 | Hughes | 138/43 |
| 3,151,628 | 10/1964 | Heckert | 251/DIG. 3 |
| 3,367,621 | 2/1968 | Griswold | 251/46 |
| 3,556,464 | 1/1971 | Griswold | 251/46 |
| 3,896,834 | 7/1975 | Paul, Jr. | 251/DIG. 3 |
| 3,967,808 | 7/1976 | Lieding | 251/46 |

FOREIGN PATENT DOCUMENTS 711693 9/1931 France .............................. 251/DIG. 3

Primary Examiner—Martin P. Schwadron
Assistant Examiner—G. L. Walton
Attorney, Agent, or Firm—Jackson, Jones & Price

[57] ABSTRACT

A metering apparatus for controlling the rate of closure of a pressure-actuated valve of a type normally used in irrigation systems. When a pressure-actuated valve is closing, fluid from a supply line must flow into a pressure-actuating chamber, gradually filling it to force the valve's plug member against its seat. The metering apparatus is a compressible spring through which fluid must flow to enter this pressure-actuating chamber. As the valve closes, it compresses the spring through which the fluid must flow, thereby restricting the rate of flow into the pressure-actuating chamber. This reduction in flow reduces the rate at which the valve's plug member approaches its seat in an exponential manner, allowing rapid closure at first which is reduced considerably as the plug approaches its seat. Such a restricted closure rate prevents pressure shock in the supply line, otherwise known as hammering or chatter, which causes damage and excess wear and tear to the supply line, to the pressure-actuated valve and to other valves in the line.

1 Claim, 3 Drawing Figures

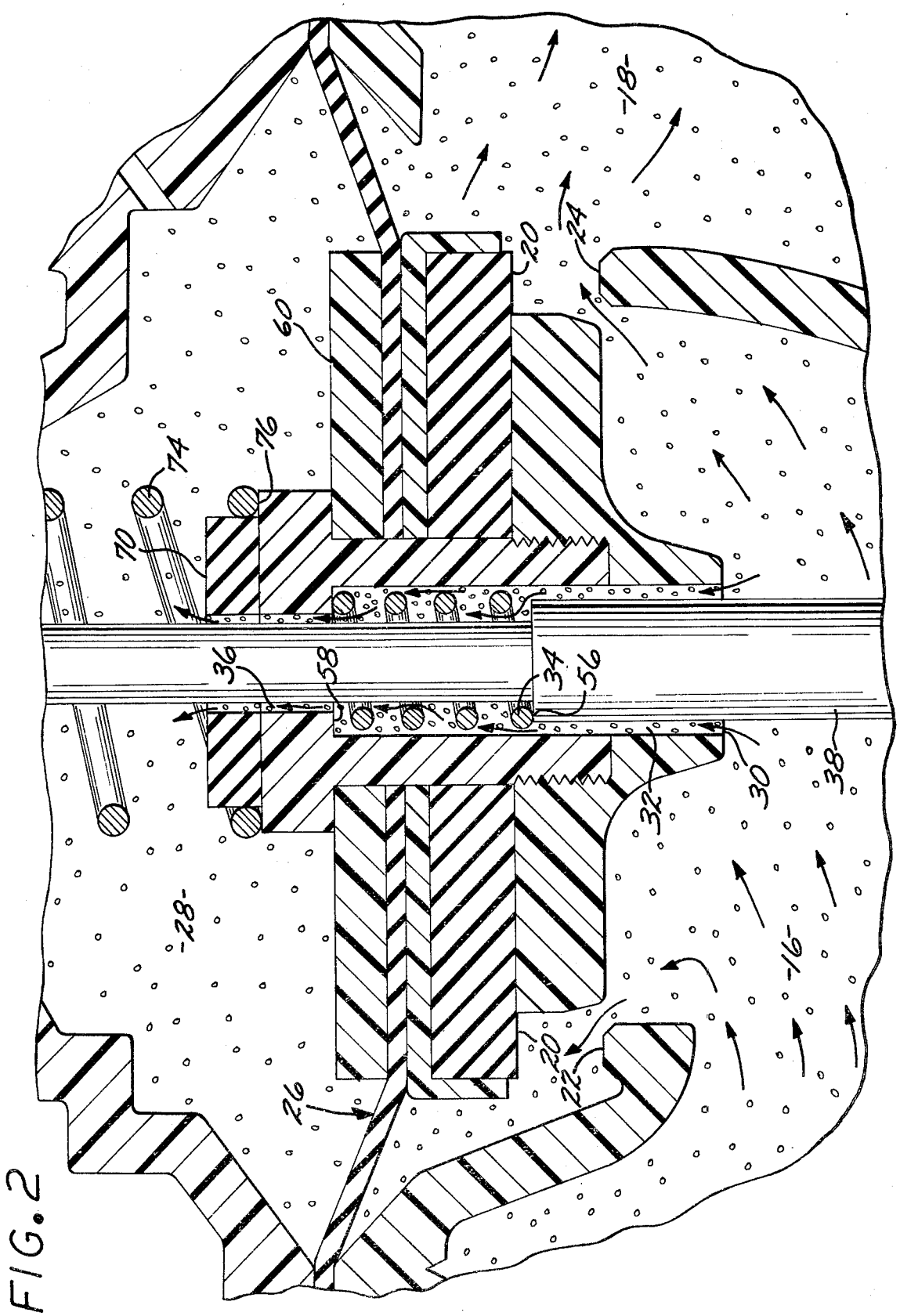

PRESSURE-ACTUATED VALVE WITH METERING CHOKE

BACKGROUND OF THE INVENTION

1. Field of the Invention

This invention relates to pressure-actuated valves which are remotely controlled such as by use of a solenoid to open or close a pilot valve, and more particularly relates to means to control the rate that these valves close.

2. Brief Description of the Prior Art

Pressure-actuated valves with which the present invention has unique application are well known in the art. They are normally comprised of a diaphragm suspended plug member with the diaphragm and plug member forming a control chamber. When the chamber is filled with fluid the plug member is forced against its seat and the valve is closed. When the chamber is substantially empty, the plug member is positioned away from its seat and the valve is open.

The conventional means of opening and closing the valve are a restricted inlet port to the valve control chamber and a pilot valve which vents the control chamber into the low pressure side of the line. When the pilot valve is initially opened, fluid will flow from the valve chamber faster than it enters through inlet port thereby opening the valve until the flow into the central chamber equalizes with the flow out of the control chamber. When the pilot valve is closed, fluid flows into the control chamber without flowing out thereby gradually forcing the valve plug against the valve seat.

Some of these pressure actuated valves include means to control the rate the valve closes, mainly by means of restricting the rate of fluid flow into the control chamber as the valve closes. If the flow into this chamber is unrestricted, the chamber will fill rapidly and the valve will close rapidly. This rapid closing must be avoided in most applications because it causes a pressure shock in the fluid in the line. This pressure shock can cause the pipes to burst when they are in a weakened condition. It also causes excess wear and tear on the closing valve as well as on other valves in the line.

If the passageway into the valve control chamber is highly restricted, the valve will close very slowly at a substantially uniform rate. This uniform rate is normally not necessary because the shock effect occurs when the valve is nearly closed. Therefore a variable rate of fluid flow restrictor is usually provided to allow the valve to close rapidly when it is open and slower when it is nearly closed.

Attempts of providing a variable restriction to the flow of fluid through the inlet port have included plungers which enter the inlet port as the valve closes. The plunger substantially and abruptly reduces the cross sectional area of the inlet port thereby reducing the rate of flow into the valve control chamber. However, an abrupt change in the closing rate of the valve is undesirable because the abrupt change itself causes undesirable transients in the line.

Other attempts of providing a variable restriction to the flow of fluid through the inlet port have provided the plunger within the inlet port at the time the plug begins its motion to the closed position. Variable restriction in flow is provided by having the inlet port be a narrow passageway which is increasingly filled by the plunger as the valve closes. These narrow passageways are susceptible to being clogged by foreign matter in the fluid, especially in applications involving irrigation systems where the water is "filthy" with dirt and other materials. These plunger/narrow passageway restrictors therefore tend to become inoperable over time. Consequently the valves using plungers in narrow passageways require the use of preliminary dirt filters in order to provide a useful life for the valve.

OBJECTS AND SUMMARY OF INVENTION

It is an object of the present invention to provide a variable flow restrictor to the valve control chamber of a pressure-actuated valve having a simple and easily manufactured design that provides for an exponential flow restriction, does not become clogged and does not require the use of a preliminary dirt filter.

It is a further object of the present invention to provide an exponentially variable flow restrictor with a self-cleaning action.

These objects are accomplished by providing a compressible spring housed in a chamber through which fluid from the supply line must flow to reach the valve control chamber in a pressure-actuated valve. Fluid enters this chamber exterior to the spring and exits the chamber interior to the spring. When the valve is open, the spring's coils are spaced relatively far apart providing the fluid relatively unrestricted access to the valve control chamber. But as the valve closes, the coils become increasingly compressed, thereby increasingly restricting the flow of fluid through them into the valve control chamber to thereby slow the rate the valve closes. When the valve is nearly closed, the spring presents a nearly solid wall to the flow of fluid. Therefore the valve will slowly and gently close preventing pressure shock.

The spring resistance to the closing of the plug member is negligible in its effect on restrictive action. The flow resistance created by the compression of the spring allows the flow restrictor to be designed with passageways that are relatively immune from clogging by foreign matter. As the spring expands during valve opening its coils are increasingly spaced apart to allow any accumulated foreign matter to pass through its coils. When the spring is compressed during valve closing its coils twist and rub together thereby providing an inherent cleaning action.

BRIEF DESCRIPTION OF THE DRAWINGS

The exact nature of the present invention will become readily apparent from the following detailed description when taken in conjunction with the accompanying drawings in which:

FIG. 2 is a fragmentary cross sectional view of the pressure-actuated valve isolated on the plug member and seat showing the plug member in a partially opened position.

DESCRIPTION OF THE PREFERRED EMBODIMENT

The following description is provided to enable any person of ordinary skill in the field of pressure-actuated valves to make and use the described variable flow restrictor as it is set forth herein. The embodiment of the invention disclosed herein is the best mode contemplated by the inventor for carrying his invention into practice.

Figure 1:
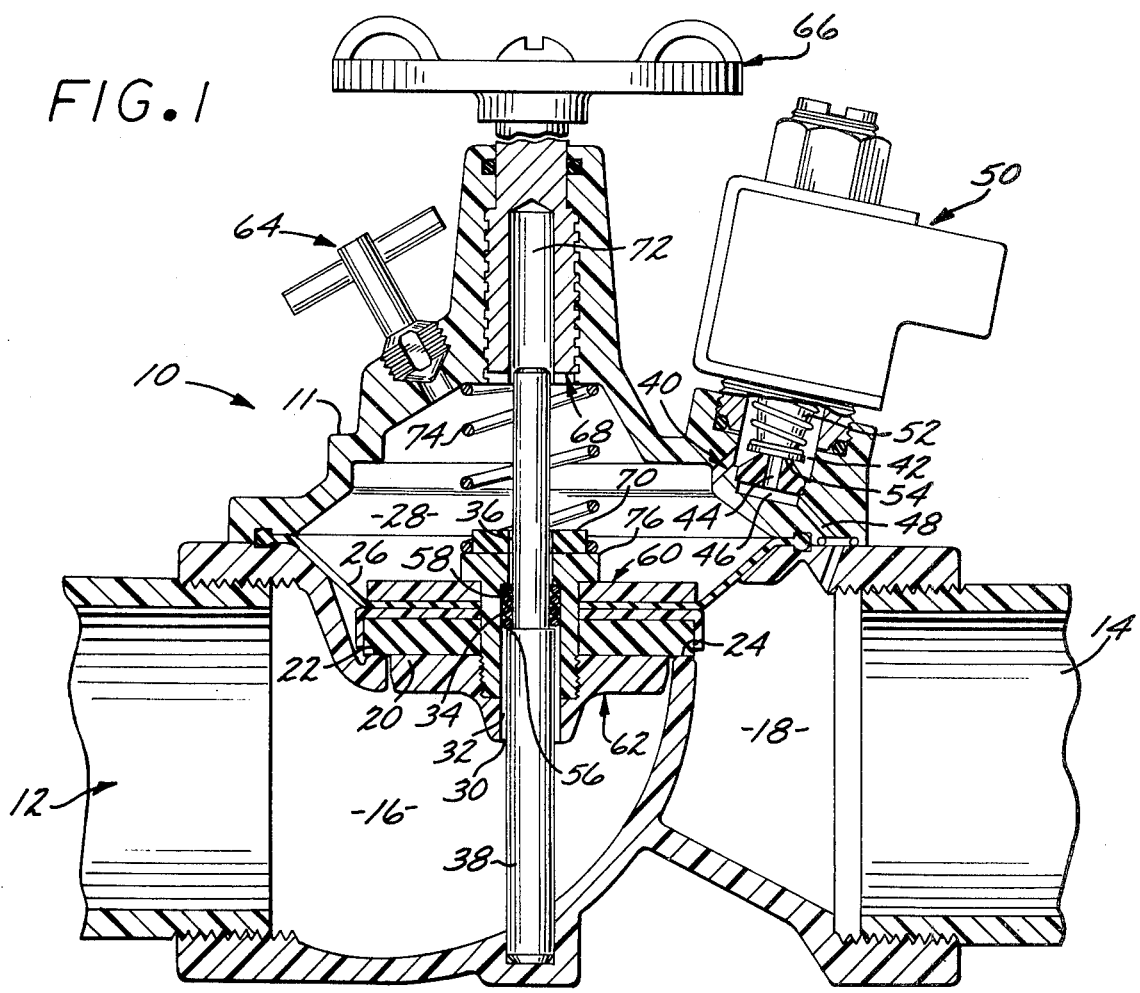
FIG. 1 is a cross sectional view of the pressure actuated valve with the valve parts shown in a closed position.

Referring first to FIG. 1, a cross sectional view of the pressure-actuated valve is disclosed. The pressure-actuated valve 10 couples to a fluid supply line on its upstream side through a conventional coupling means 12 and on its downstream side through conventional coupling means 14. When the valve is open as shown in FIG. 2, fluid will flow from the supply line into chamber 16 past plug seats 22 and 24 into chamber 18 and from there into the downstream supply line.

Plug seats 22 and 24 are opposite segments of a single circular continuous plug seat, which shall hereinafter be referred to as plug seat 22. When plug member 20 is seated with seat 22, no fluid is free to flow from upstream chamber 16 past the plug seat 22 into downstream chamber 18.

Plug member 20 is coupled to the body of pressure-actuated valve 10 by means of flexible resilient diaphragm 26. The plug member 20, diaphragm 26 and the upper portion of the housing section 11 of the pressure-actuated valve 10 forms a control chamber 28. Fluid is free to flow into control chamber 28 from upstream chamber 16 through inlet port 30 up passageway 32 past flow restrictor spring 34 and through passageway 36 into chamber 28. The inlet port, and each of these passageways forms a hollow ring about shaft 38, which protrudes through plug member 20.

Fluid is free to exit from control chamber 28 through passageway 40, chamber 42, passageway 44, chamber 46 and passageway 48 into downstream chamber 18, and from there into the downstream fluid supply line. Fluid will flow through the series of passageways and chambers when solenoid 50 withdraws its control plug 52 from seat 54. When the solenoid 50 causes control plug 52 to abut against seat 54 no fluid can flow from control chamber 28 into downstream chamber 18.

When the valve 10 is closed as shown in FIG. 1, flow through passageways 32 and 36 into chamber 28 is substantially blocked by flow restrictor spring 34 which is in its fully compressed position as shown. When the spring 34 is fully compressed it forms substantially a solid wall to the flow of fluid through passageway 32 and into or out of the control chamber 28.

When solenoid 50 withdraws its control plug 52 from seat 54 it allows chamber 28 to vent fluid into upstream chamber 18. As the fluid in control chamber 28 vents through passageway 40, 44 and 48 into downstream chamber 18 the pressure in control chamber 28 is reduced. As a result, the higher pressure in chamber 16 will force plug member 20 to rise off its seat 22. Diaphragm 26 will also unflex reducing the volume of valve control chamber 28.

As this occurs fluid will begin flowing from upstream chamber 16 into downstream chamber 18, as shown in FIG. 2. Flow restrictor spring 34 will be spaced apart, as is shown in FIG. 2, allowing fluid to flow through the spring coils and into control chamber 28. This will allow fluid to flow into control chamber 28 from chamber 16. However because fluid from control chamber 28 is being vented faster than it is entering, plug 20 will continue to move away from seat 22. The valve 10 will continue to open. As the plug moves further away from seat 22 spring 34 will become even more spaced apart allowing more fluid into chamber 28. At a certain point the flow into chamber 28 from upstream chamber 16 will be equal to the flow venting from chamber 28 into downstream chamber 18. At this point the valve 10 will stop opening and remain in a steady state condition.

If the solenoid 50 causes control plug 52 to seat against its seat 54 closing passageway 44 from chamber 42, fluid will no longer be free to vent from valve control chamber 28 to downstream chamber 18. Pressure in the valve control chamber 28 will then increase. The increasing fluid pressure in chamber 28 will tend to force plug member 20 toward its seat 22. Thus fluid will continue to flow from upstream chamber 16 through passageways 32 and 36 into chamber 28 gradually forcing plug member 20 towards its valve seat 22.

If the flow into chamber 28 were unrestricted, the pressure differential between chamber 28 and the area just below plug member 20 would continue to increase as the flow between plug member 20 and its seat 22 continued to become more restricted. Thus the valve would tend to increase its closing rate the more closed it became; and the valve would slam shut causing a pressure shock in the fluid supply line which is otherwise known as hammering or chattering.

The present invention, however prevents this from happening. Flow restrictor spring 34 is logged between passageways 32 and 36 by shoulder 56 on shaft 38 and by shoulder 58 on plug member 20 so that the fluid must flow through the coils of the spring to get from passageway 32 into passageway 36. As the plug member closes it compresses the flow restrictor spring 34.

As the spring 34 is compressed it tends to resist the closure of valve member 20 with a force proportional to a constant k times the displacement x from an equilibrium position $X_o$, which is the natural unflexed position of the spring. This can be represented in the form of an equation where the resistance force of the spring is equal to $$F_s = -k(x - x_o).$$

It can be seen from this equation that the resistance of the spring increases the further the valve closes and would thus tend, however negligably, to slow the movement of the plug member 20 toward its valve seat 22.

More important, however, is the fact that as the spring closes, the flow through the coils of the spring tends to become increasingly restricted. With the flow of fluid being increasingly restricted, valve control chamber 28 will be filled at a slower rate thereby causing plug member 20 to approach its seat 22 at a decreasing rate. The restriction of fluid flow through the coils of spring 34 is inversely proportional to the area through which the fluid can flow. The total area of the cylinder of the spring is given by the formula $$A = \pi r^2 l$$

where r is the radius of the spring, and l is its length.

The area occupied by the spring itself is a constant C and is equal to $$C = \pi r^2 l_o$$

where $l_o$ is the length of the spring in its fully compressed condition. Thus at any given l, the area through which the fluid has passageway to flow is given by the formula $$A = \pi r^2 (l - l_o).$$

Because the resistance to flow is inversely proportional to the area through which the fluid has to flow, the force of resistance $F_r$ can be written $$F_r = k_r / \pi r^2 (l - l_o)$$

where $k_r$ is a constant.

This force of resistance to flow is cumulative with the force of resistance of the spring as the spring is compressed.

Figure 3:
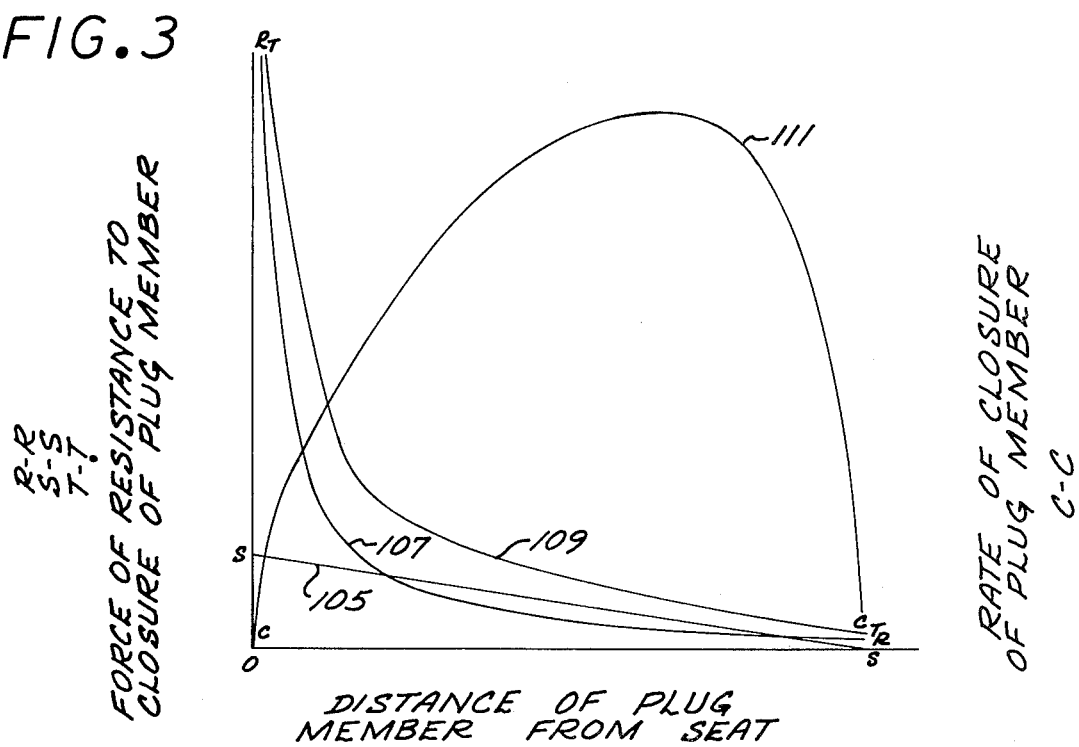
FIG. 3 is a graph showing the relationship between valve position and its closing rate and also between valve position and the resistance to the closure of the valve from the spring and from the flow restricting properties of the spring.

A hypothetical graph of these forces is shown in FIG. 3. As can be seen from FIG. 3, the resistance of the spring, S—S, shown by plot 105, as it is compressed is substantially linear. The resistance to flow through the spring's coils, R—R, shown as plot 107, shows that the resistance sharply rises as the plug member 20 closely approaches its seat 22. The graph also shows a plot 109 which is the vector sum of the forces of spring force, $F_s$, and flow resistance, $F_r$. Although the cumulative resistance force, $F_t$, the vector sum of $F_s$ and $F_r$, acts against the force due to the pressure differential between valve control chamber 28 and the area just below plug member 20, it can be seen that the flow resistance force is the most important force. The springs actually used therefore may have a negligible spring constant k. Because the flow resistance force, R—R, rises sharply as the plug member 20 approaches its seat 24, the speed, C—C, of approach shown as plot 111 in FIG. 3, sharply decreases. Plug member 20 will thus softly and slowly seat against its seat 22. Note that instantaneous slope of any point on plot 111 is proportional to the vector sum of the total resistance force, $F_t$, and the force due to the pressure differential between control chamber 28 and the area just below plug member 20.

With the plug 20 seated against its seat 22, the pressure in chambers 28 and 16 will be equal. However, due to the design of the plug member 20 having a broader cross sectional area on the surface 60 facing valve control chamber 28 than the surface 62 facing upstream chamber 16, the cumulative force, $F_p$, due to pressure on the surface 60 will be greater than the cumulative force on the surface 62, thereby holding plug member 20 against its valve seat 22.

However, when plug member 20 is seated, spring 34 is providing a maximum force, $F_s$, tending to force the plug member off its seat 22. If the spring constant, k, of spring 34 is not sufficiently small so that this spring force, $F_s$, is not less than the force, $F_p$, due to the difference in area between plug surfaces 60 and 62, spring 34 will prevent plug member 20 from remaining seated. This difficulty can be overcome by reducing the spring constant, k, of spring 34, increasing the area of plug surface 60 relative to plug surface 62, or providing a spring 74, lodged between housing member 11 and shoulder 76 on plug member 20, to counterbalance the force, $F_s$, of spring 34.

Such a spring 74 is provided in the preferred embodiment. This spring 74 will not only assist in keeping plug member 20 seated, but it will also affect the equilibrium position at which the plug member 20 is fully open and will aid in the closing of plug member 20 when solenoid 50 shuts off the venting of fluid from control chamber 28.

Additional parts shown in FIG. 1 of the pressure-actuated valve 10 which do not form a part of this invention are manual controls 64 and 66. When manual control 64 is operated, chamber 28 is allowed to vent to the outside of the pressure-actuated valve 10. This allows the plug member 20 to rise from its seat 22 thereby opening valve 10 to the flow of fluid. When manual control 66 is operated, slide 68 is driven against the top 70 of plug member 20 to drive plug member 20 against its seat 22 thereby closing valve 10. Chamber 72 in slide 68 will slideably receive the upper portion of shaft 38 as slide 68 lowers into valve control chamber 28.

It is important to note that the resistance to the closure of the plug member 20 rises sharply in a nonlinear fashion as plug member 20 approaches its seat 22. The initial movement of plug member 20 toward its valve seat can be allowed to be quite rapid. Because the rapidity of movement of plug member 20 toward its seat 22 is controlled by the total capacity of passageways 32 and 36, these passageways can be made to be relatively large as compared to devices known in the prior art which heavily relied on a restricted bleed-type passageway to slow down the flow of fluid into the valve control chamber. The relatively large cross sectional area of the passageways 32 and 36 provides for a high dirt handling capability. Further, any dirt that does get into passageway 32 cannot clog the action of flow restrictor spring 34; for when the coils of spring 34 are fully spaced apart, any dirt lodged between the coils will be free to flow through them and into control chamber 28.

The nonlinear flow restricting capability of the restrictor spring 34 is a surprising feature of the present invention as can be seen from the discussion above. This not only provides a variable flow restrictor to prevent pressure shock and hammering in the supply lines, but it also allows the bleed-type passageways 32 and 36 to be of such a relatively large cross sectional area that the total capability to handle dirt and other foreign matter in the fluid entering these passageways is substantially increased over pressure actuated valves known in the prior art. This capability is accomplished without the use of a preliminary dirt filter.

Therefore in light of the above detailed description of the preferred embodiment, I claim:

1. In a pressure-actuated diaphragm valve having a body member, a seat mounted within said body member, a plug member co-operable with said seat to form a valve control chamber, inlet and outlet passageways connecting said chamber with a fluid supply line, and pilot means to cause said control chamber to fill with fluid from said supply line to force said plug member against said seat, the improvement therein comprising:

a hollow shaft, with an interior first shoulder, in said plug member which allows a fluid to flow through said plug member and into said valve control chamber;

a stem having an exterior second shoulder and having a smaller cross sectional area than said hollow shaft, said stem being mounted within said body member to protrude into said hollow shaft past said first shoulder; and a helical coil mounted between said first and second shoulders such that said coil is compacted when said plug member is seated against said seat and is spaced apart when said plug member is positioned away from said seat and said helical coil provides exponentially increasing resistance to the flow of fluid through its coils and into said valve-control chamber as said plug member approaches said seat.

* * * * *